Patented Sept. 8, 1936

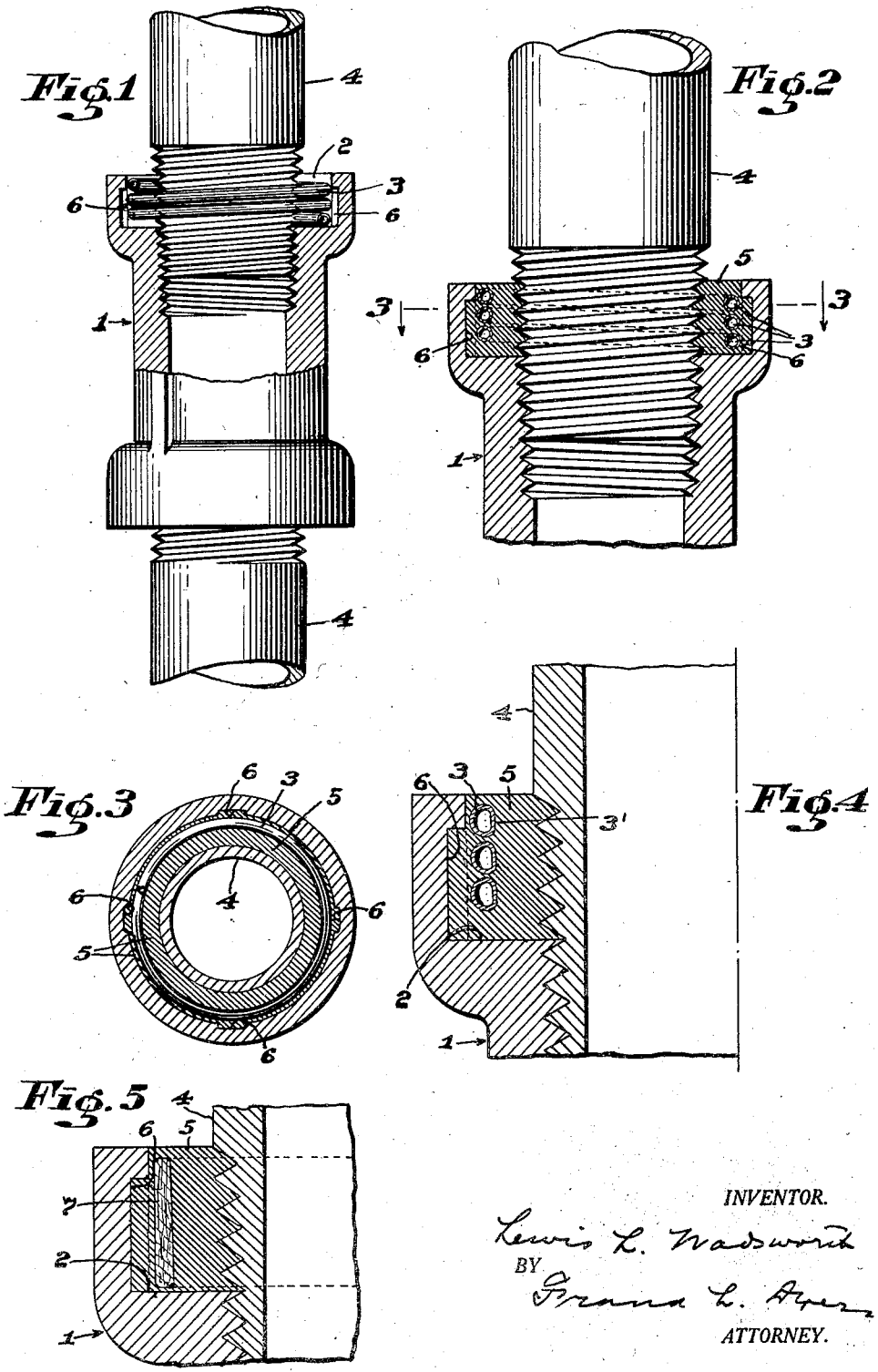

2,053,807

UNITED STATES PATENT OFFICE 2,053,807

PROTECTIVE PIPE COUPLING

Lewis L. Wadsworth, Winchester, Mass.

Application January 17, 1936, Serial No. 59,495

2 Claims. (Cl. 285—159)

My invention relates to an improved protective pipe coupling, that is to say, a sleeve or coupling member employed for fastening the contiguous ends of pipes in a pipe line and my object is to provide a pipe coupling with which the threaded portion of each pipe section will be effectively protected from oxidation and other weathering disintegration.

When a pipe and fitting or coupling are tightly made up or screwed together, under present practice, there remains an exposed portion of the male pipe threads projecting beyond each end of the coupling. These threads are exposed for the reason that in the threading of a pipe the die cuts to a smaller diameter at the beginning and this diameter increases as the cutting progresses. This provides a tapered thread onto which the coupling or other fitting screws, the fit between the pipe and coupling becoming more and more tight as the engagement progresses until the pipe is screwed home. The exposed male threads outside the coupling are subject to rust and other disintegration which eventually results in leakage and breakage.

By means of my present invention I am enabled to provide a protective coupling with which no male threads are exposed, while at the same time a superior joint will be obtained so far as strength and tightness are secured.

In order that my invention may be better understood attention is directed to the accompanying drawing forming a part of this specification and in which Figure 1 is an elevation partly in section showing two contiguous pipe sections partially screwed home in a suitable coupling and illustrating the employment of a collapsible spiral metal tube at each end of the coupling, the function of which will be hereafter explained.

Figure 2 is an enlarged elevation partly in section showing only a portion of the coupling with the plastic material in place, the pipe being in the position of Figure 1.

Figure 3 is a cross section on the line 3—3 of Figure 2 looking in the direction of the arrows.

Figure 4 is an enlarged sectional view illustrating the completed protective joint and Figure 5 a sectional view similar to Figure 4 illustrating a modification hereafter referred to.

In all the above views corresponding parts are represented by the same numerals.

The coupling 1 is a metal sleeve of suitable dimensions being formed on each end with an integral enlarged section 2 constituting a cup. The coupling at each end is formed with interior threads as shown with which the threaded end of pipe 4 may engage. Within the cup 3 and surrounding the threads of the pipe 4 I show, in Figures 1 to 4 inclusive, a small pipe 3 arranged spirally and made of some collapsible metal, such as lead or aluminum.

In setting up the improved joint the pipe 4 is first preferably screwed into the end of the coupling to a refusal and is then backed out several turns so as to expose a portion of the threaded end of the pipe beyond the cup 2 as in Figures 1 and 2. A suitable plastic material 5 is now introduced within the cup 2 so as to fill the same as shown in Figure 2 and entirely embed therein the collapsible pipe 3. This plastic material is preferably lead applied in a molten state and after cooling it will be tightly anchored in place by reason of the depressions or vertical grooves 6 shown in all the figures. In other words, this interlock will prevent rotary motion of the plastic seal 5 when the pipe is screwed home. After the plastic 5 has cooled and set the pipe 4 is now screwed to a refusal, so as to bring the threads within the outer edge of the seal 5 as shown in Figure 4 and thus prevent rusting or deterioration thereof.

Owing to the fact that the threads taper, this engagement with the seal 5 will cause it to be displaced so as to collapse the spiral pipe 3 slightly as shown at 3'. The result is an extremely strong and watertight joint in which there are no exposed threads.

It is not necessary to make use of a small coiled pipe 3 as described to accommodate the displacement of the sealing material 5 as explained and in Figure 6 I illustrate the employment of a ring 7 made of some compressible material, like asbestos fibre, which will yield in the same way when the sealing material is displaced. Obviously in lieu of asbestos fibre a paste of asbestos may be used, if properly compressible, to allow for the displacement of the seal 5.

Having now described my invention, what I claim as new therein and desire to secure by Letters Patent is as follows:

1. An improved protective coupling comprising a coupling member and a pipe screw threadedly engaging the same by means of tapered male threads, a cup at the end of the coupling member, compressible material within the cup surrounding the pipe threads and a displaceable seal filling the cup, whereby when said seal is displaced by screwing the pipe home, said compressible material will be correspondingly distorted.

2. A protective coupling as recited in claim 1, wherein the compressible material is in the form of a small spirally wound metal pipe.

LEWIS L. WADSWORTH.